No. 696,159. Patented Mar. 25, 1902.
L. H. BEST.
SAFETY VEHICLE BRAKE.
(Application filed June 5, 1901.)
(No Model.)
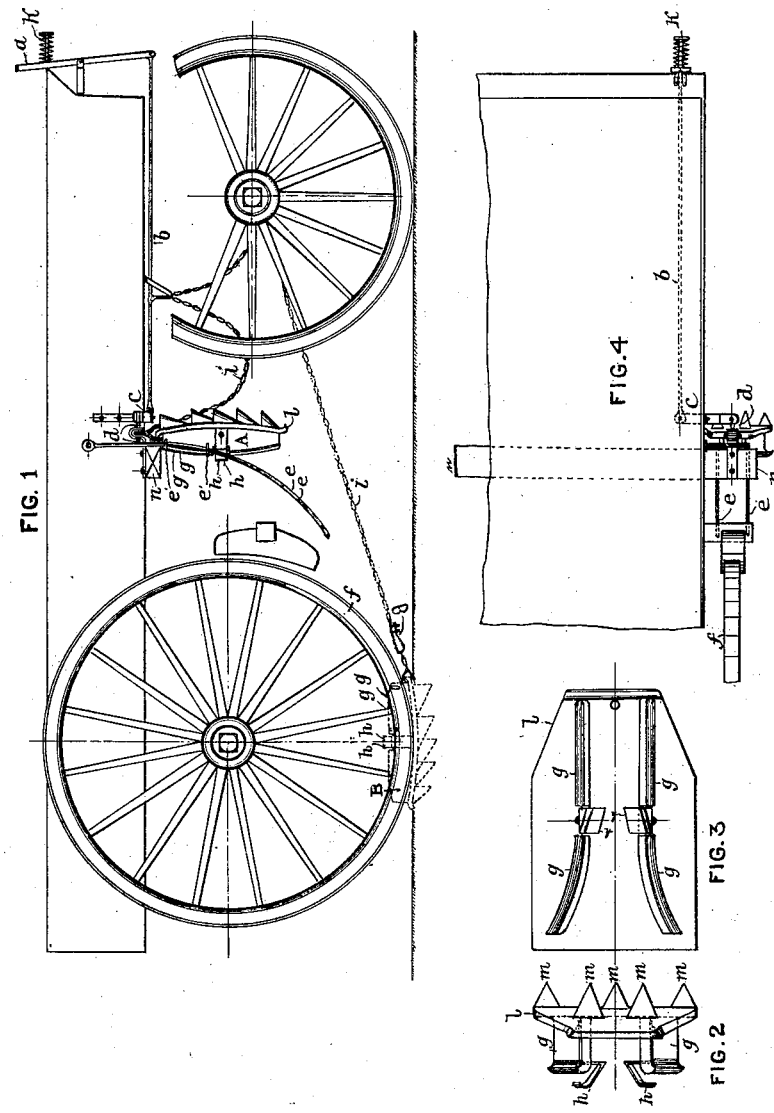
WITNESSES:
S. M. Rown.
G. M. Davis
INVENTOR
Louis H. Best,
BY
R. A. Crossman
ATTORNEY.

UNITED STATES PATENT OFFICE.

LOUIS H. BEST, OF PUEBLO, COLORADO.

SAFETY VEHICLE-BRAKE.

SPECIFICATION forming part of Letters Patent No. 696,159, dated March 25, 1902.

Application filed June 5, 1901. Serial No. 63,326. (No model.)

*To all whom it may concern:*

Be it known that I, LOUIS H. BEST, a citizen of the United States, residing at Pueblo, in the county of Pueblo, State of Colorado, have invented a new and useful Improvement in Safety Vehicle-Brakes; and I do hereby declare the following to be a full, clear, and exact description of my invention, such as will enable others skilled in the art to which it appertains to make and use the same.

My invention relates to improvements in safety vehicle-brakes and in means for applying safety-brakes to vehicles; and the object of my improvement is, first, to provide a safety-brake for vehicles, and, second, to afford facilities for the proper adjustment and operation thereof.

The apparatus is made and used substantially as set forth hereinafter and as shown in the accompanying drawings, in which—

Figure 1 is a side view of vehicle and safety-brake; Fig. 2, a sectional end view of safety-brake; Fig. 3, a top view of safety-brake plate; Fig. 4, a sectional view of bottom of vehicle-bed, showing trip-gearing of brake and cross-bar $n$ of bed on which safety-brake is hung for carriage.

A shows safety-brake as carried in position for use.

B shows safety-brake locking wheel of vehicle.

To operate safety-brake, the foot is placed against the lever $a$, pushing it forward. The rod $b$, operating on the evener $c$, draws the bolt or pin $d$, allowing the safety-brake to drop, when the safety-brake sliding down the rods or prongs $e\ e$, dropping in front of and under the vehicle-wheel $f$, which rolls into the ribs $g\ g$ on the safety-brake and is clamped by the springs $h\ h$, the safety-brake being held by the chain $i$, hung near the center of front vehicle-axle, firmly locks rear wheel $f$. The brake carries eyelets $e''\ e''$ for receiving the rods $e\ e$. These ribs $g\ g$ are curved outwardly on their front ends to permit the easy entrance of the wheel.

To release the safety-brake from locked wheel, (the chain $i$ is disconnected by a finger-link $j$,) spread the springs $h\ h$, and the wheel may then roll out. The safety-brake may then be slid up the rods or prongs $e\ e$ to carriage position and pinned there by a bolt $d$, as shown in drawings, and the pressure of the coil-spring $k$ on the lever $a$ holds the bolt $d$ firmly in place.

The brake plate or shoe $l$ may be made with teeth, as shown, for use in mountainous countries, or without teeth for ordinary hills.

The chain $i$ is carried in a V, which opens and shuts at point (or bottom) as lever $a$ is pressed or released.

I claim—

In a safety-brake for vehicles, a brake-shoe, curved guide-rods carried by the bed of the vehicle, teeth carried on the under side of said brake-shoe, eyelets secured to said brake-shoe and receiving said guide-rods, a pair of suitably-spaced ribs secured to the upper face of said brake-shoe, said ribs having their rear ends outwardly curved, a pair of springs carried by the brake-shoe for engagement with the side of the wheel-rim, a link connected to the upper end of said brake-shoe, an evener secured to the body of the vehicle, a pin carried by the evener for engagement with said link carried by the brake-shoe, a spring-pressed rod secured to the evener, a chain connected to the upper end of said brake-shoe, a device for securing said chain at an intermediate point, said chain having its other end secured to the axle of the vehicle and being released from said device simultaneously with said brake-shoe, the device being connected at its one end to the said spring-pressed rod, substantially as described.

In testimony whereof I have hereunto set my hand and subscribed my name to the foregoing specification in the presence of two subscribing witnesses.

LOUIS H. BEST.

Witnesses:
J. H. WHITESIDE,
A. WHITESIDE.